(12) United States Patent  
Shibata et al.

(10) Patent No.: US 6,234,783 B1  
(45) Date of Patent: May 22, 2001

(54) INJECTION MOLDING NOZZLE

(75) Inventors: Itsuo Shibata; Shigeo Wada, both of Hiratsuka; Hitoshi Toki, Isehara; Hiroyuki Iida, Kanagawa-ken, all of (JP)

(73) Assignees: Ju-Oh Inc., Hiratsuka; The Japan Steel Works, Ltd., Tokyo, both of (JP)

(*) Notice: Subject to any disclaimer, the term of this patent is extended or adjusted under 35 U.S.C. 154(b) by 0 days.

(21) Appl. No.: 09/285,680

(22) Filed: Apr. 5, 1999

(30) Foreign Application Priority Data

Apr. 7, 1998 (JP) .................................... 10-094996

(51) Int. Cl.[7] .................................................. B29C 45/23
(52) U.S. Cl. .......................... 425/549; 425/562; 425/564
(58) Field of Search .................................. 425/562, 563, 425/564, 565, 566, 549

(56) References Cited

U.S. PATENT DOCUMENTS 4,492,556 * 1/1985 Crandell ................................ 425/549

5,096,646 * 3/1992 Shigemoto et al. .................. 425/113

FOREIGN PATENT DOCUMENTS 61-272119 12/1986 (JP) .

OTHER PUBLICATIONS

Julius Grant, Hackh's Chemical Dictionary, p. 611, 1969.*  
61-272119, Moulding Device for plasticised materials, Dec. 2, 1986, Abstract.

* cited by examiner

*Primary Examiner*—Tim Heitbrink  
(74) *Attorney, Agent, or Firm*—Jacobson, Price, Holman & Stern, PLLC

(57) ABSTRACT

An improved injection molding nozzle shows a high hardness and is chemically stable so that the inner surface thereof is not corroded nor the gas or the fluid forced to penetrate into the gap between the injection molding nozzle and the valve pin seize the valve pin regardless of the temperature and the pressure of the material to be injected. Additionally, the valve pin is not pliable and does not give rise to a collapse on the part of the valve pin. The injection molding nozzle to be used for resin and molten metal is characterized in that it is made of a ceramic material and at least part of the outer periphery is covered with metal.

4 Claims, 7 Drawing Sheets

INJECTION MOLDING NOZZLE

BACKGROUND OF THE INVENTION

1. Field of the Invention

This invention relates to an injection molding nozzle to be used for injection molding of resin or molten metal.

2. Related Background Art

Known nozzles, nozzle main bodies and valve pins to be used for injection molding are typically made of metal such as tool steel and hence cannot be used with glass fiber, carbon fiber, resin containing a filler material and molten metal.

Known injection molding nozzles made of metal are accompanied by the following problems.

(1) The metal has a low hardness and is chemically unstable so that the gas or the fluid forced to penetrate into the gap between the injection molding nozzle and the valve pin by the temperature and the pressure of the material to be injected can seize the valve pin.
(2) The pliability of the metal can give rise to a collapse on the part of the valve pin and a certain degree of deviation in the coaxiality between the valve pin and the gate.
(3) The metal shows a large coefficient of thermal expansion to make it difficult to maintain a high degree of machining accuracy during the manufacturing process.
(4) The large coefficient of thermal expansion and the easy cuttability of the metal make it difficult to enhance the surface smoothness and the surface planeness.

SUMMARY OF THE INVENTION

In view of the above identified problems of known metal-made injection molding nozzles, it is therefore an object of the present invention to provide an improved injection molding nozzle that shows a high hardness and is chemically stable so that the inner surface thereof is not corroded nor the gas or the fluid forced to penetrate into the gap between the injection molding nozzle and the valve pin seize the valve pin regardless of the temperature and the pressure of the material to be injected.

Another object of the present invention is to provide an injection molding nozzle, wherein the valve pin is not pliable and does not give rise to a collapse on the part of the valve pin.

Still another object of the present invention is to provide an injection molding nozzle, whose material shows a small coefficient of thermal expansion to make it easy to maintain a high degree of machining accuracy during the manufacturing process.

A further object of the present invention is to provide an injection molding nozzle, wherein the large coefficient of thermal expansion and the high machinability of the material of the nozzle enhance the surface smoothness and the surface planeness.

According to the invention, the above objects are achieved by providing an injection molding nozzle to be used for resin and molten metal, said nozzle is made of a ceramic material and at least part of the outer periphery is covered with metal.

Preferably, the valve pin to be combined with said nozzle is at least partly made of a ceramic material. Preferably, said nozzle is heated by electromagnetic induction. Preferably, the valve pin sliding hole and the injection path of said nozzle communicate with each other.

DETAILED DESCRIPTION OF THE PREFERRED EMBODIMENTS

Now, the present invention will be described by referring to the accompanying drawings that illustrate preferred embodiments of the invention.

[Embodiment 1]

Figure 1:
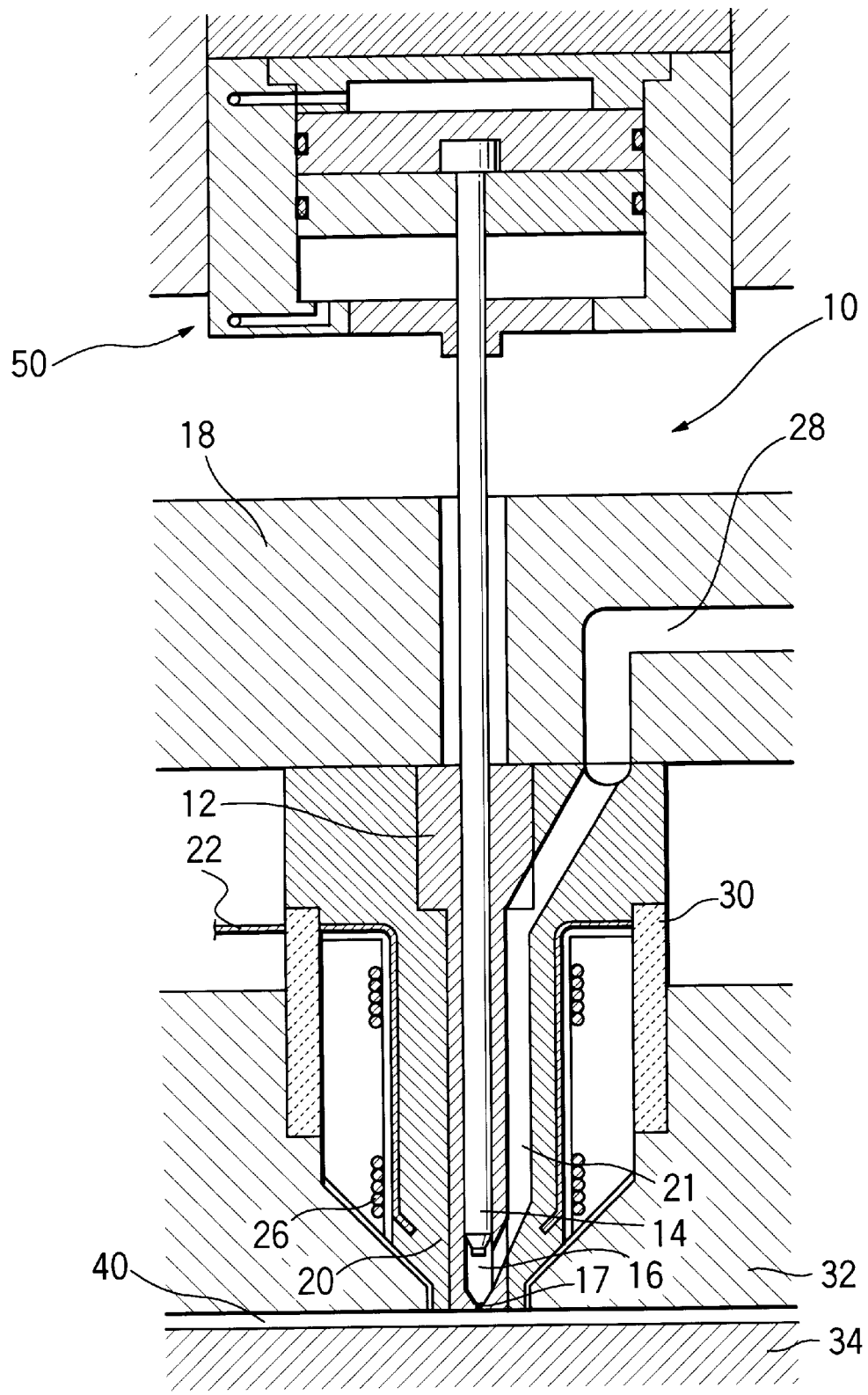
FIG. 1 is a schematic cross sectional view of an injection molding machine incorporating a first embodiment of injection molding nozzle according to the present invention.

FIG. 1 schematically shows a first embodiment of the invention. Referring to FIG. 1, the nozzle core 12 of the injection molding nozzle 10 of the first embodiment has a valve pin hole 16 that allows a valve pin 14 to pass therethrough and has a gate 17 at the front end thereof. The nozzle core 12 of the injection molding nozzle 10 is rigidly shrinkage-fit into a metal sleeve 20. A resin path 21 is formed between the metal sleeve 20 and the nozzle core 12. An electromagnetic induction coil 26 is fitted to the outer periphery of the metal sleeve 20 by baking. Manifold 18 is provided with a manifold resin path 28 communicating with the resin path. A temperature sensor is arranged in a manner as indicated by 22.

The nozzle core 12 is made of alumina having a Vickers hardness of 2,300 Hv and the metal sleeve 20 is made of dies steel, whereas the valve pin is made of silicon nitride having a Vickers hardness of 1,400 Hv. The metal sleeve 20 is supported by a stationary cavity member 32 of a stationary metal mold half by way of an insulator ring 30 and the cavity member 32 cooperates with a movable cavity member 34 of a movable side metal mold half to form a cavity 40.

A pneumatic cylinder unit 50 or a hydraulic cylinder unit (not shown) is arranged above the manifold to drive the valve pin 14 to reciprocate in order to open and close the gate 17.

[Embodiment 2]

Figure 2:
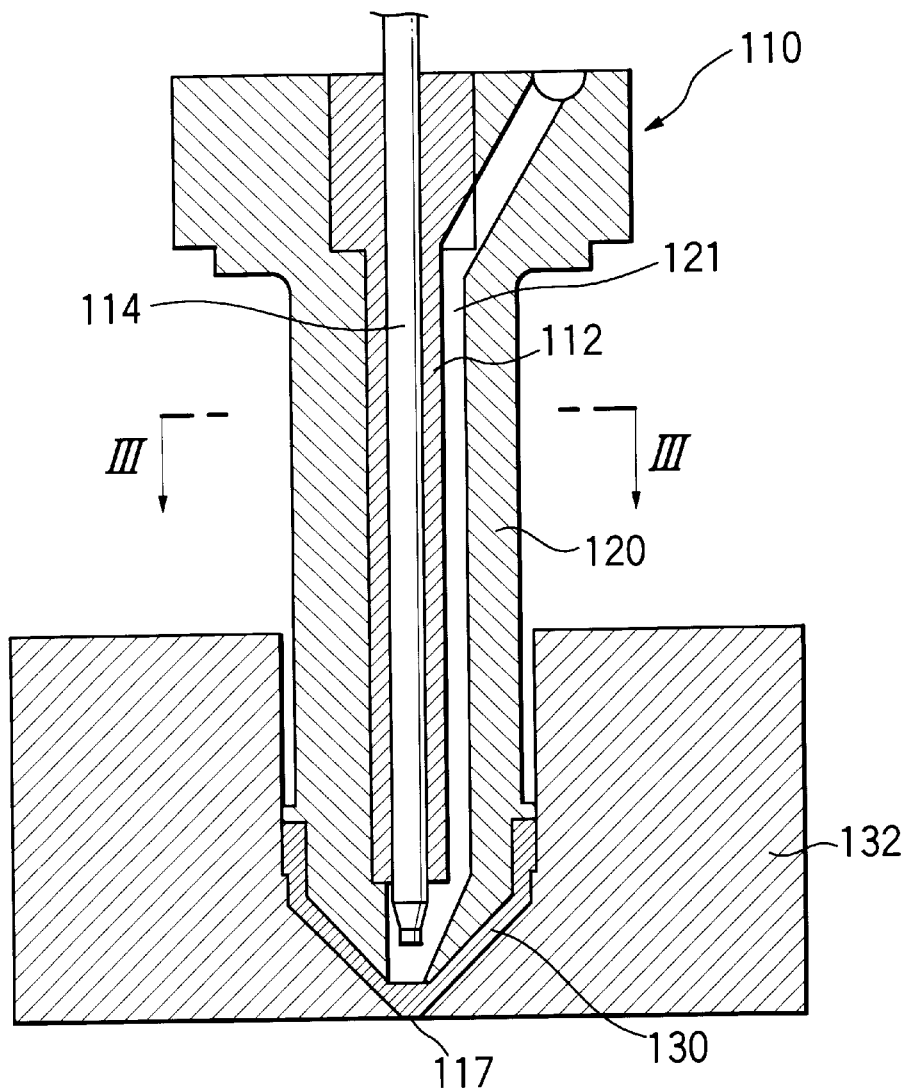
FIG. 2 is a schematic vertical cross sectional view of a second embodiment of injection molding nozzle according to the present invention.
Figure 3:
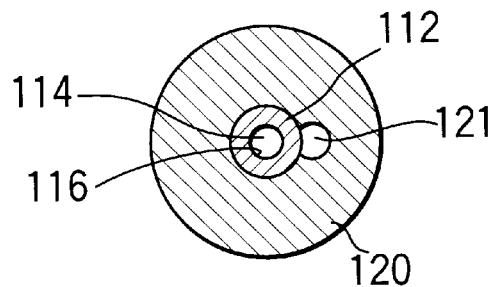
FIG. 3 is a schematic horizontal cross sectional view of the embodiment of FIG. 2 taken along line III—III.

FIGS. 2 and 3 schematically show a second embodiment of injection molding nozzle according to the invention. Referring to FIGS. 2 and 3, the nozzle core 112 of the injection molding nozzle 110 of the second embodiment is made of a ceramic material such as silicon nitride and has a valve pin hole 116 that allows a valve pin 114 to pass therethrough. The nozzle core 112 of the injection molding nozzle 110 is rigidly shrinkage-fit into a metal sleeve 120. The metal sleeve 120 has a metal sleeve resin path 121 arranged such that its horizontal cross section overlaps that of the nozzle core 112. The metal sleeve 120 is supported by a stationary cavity member 132 of a stationary metal mold half by way of an insulation layer of resin (well) 130. A gate 117 is formed at the lower end of the stationary cavity member 132.

[Embodiment 3]

Figure 4:
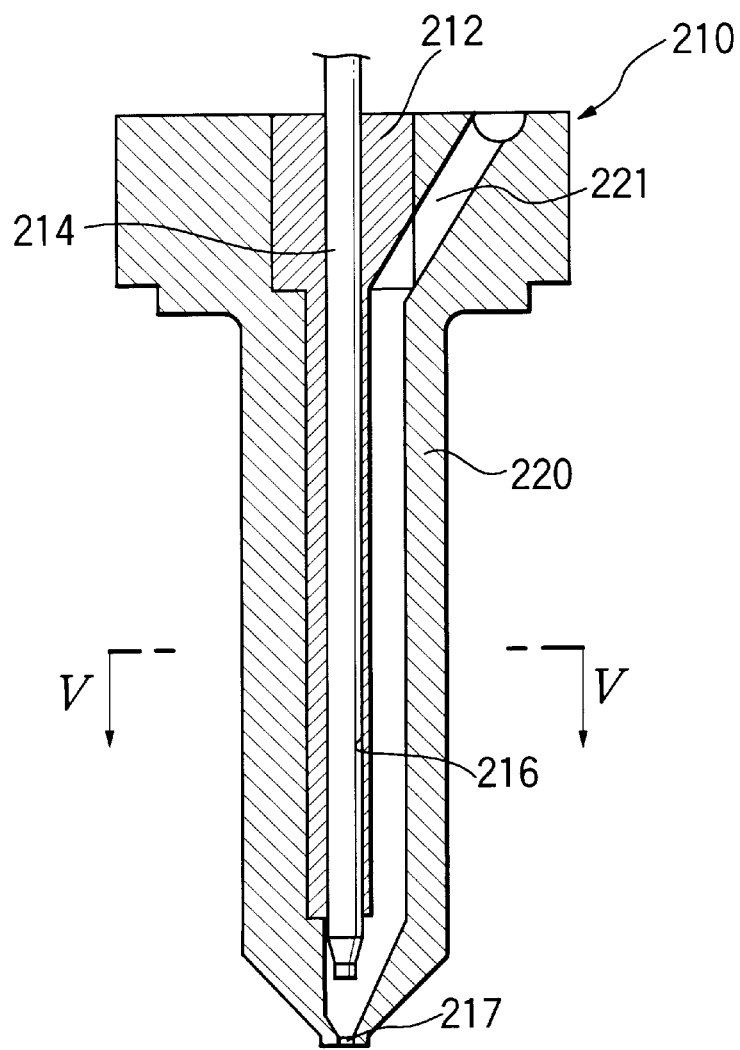
FIG. 4 is a schematic vertical cross sectional view of a third embodiment of injection molding nozzle according to the present invention.
Figure 5:
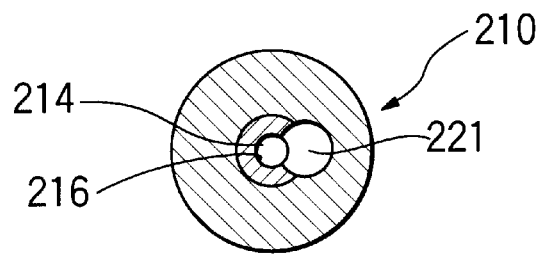
FIG. 5 is a schematic horizontal cross sectional view of the embodiment of FIG. 4 taken along line V—V.

FIGS. 4 and 5 schematically show a third embodiment of injection molding nozzle according to the invention. Referring to FIGS. 4 and 5, the nozzle core 212 of the injection molding nozzle 210 of the third embodiment has a valve pin hole 216 that allows a valve pin 214 to pass therethrough and a gate 217 is formed at the front end of the valve pin 216. The nozzle core 212 of the injection molding nozzle 210 is rigidly shrinkage-fit into a metal sleeve 220. The metal sleeve 220 has a metal sleeve resin path 221 arranged such that its horizontal cross section overlaps that of the valve pin 216.

[Embodiment 4]

Figure 6:
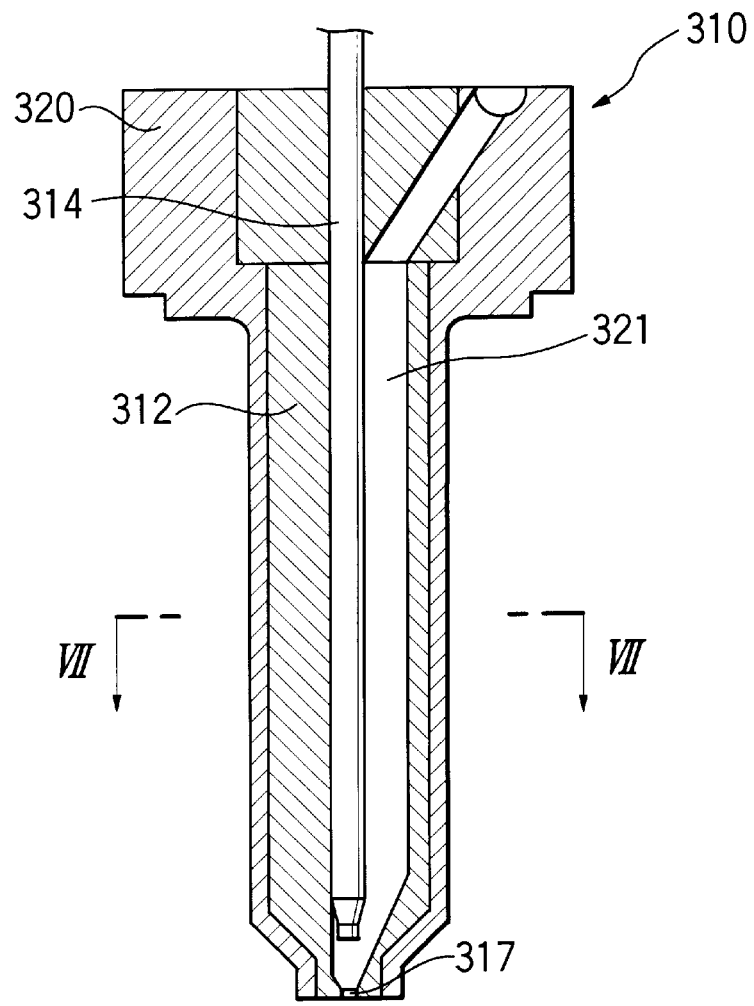
FIG. 6 is a schematic vertical cross sectional view of a fourth embodiment of injection molding nozzle according to the present invention.
Figure 7:
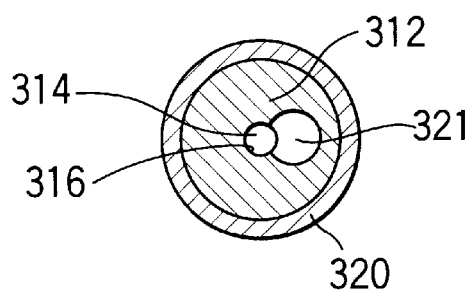
FIG. 7 is a schematic horizontal cross sectional view of the embodiment of FIG. 6 taken along line VII—VII.

FIGS. 6 and 7 schematically show a fourth embodiment of injection molding nozzle according to the invention. Referring to FIGS. 6 and 7, the nozzle core 312 of the injection molding nozzle 310 of the fourth embodiment has a valve pin. hole 316 that allows a valve pin 314 to pass therethrough and a gate 317 is formed at the front end of the valve pin 316. The nozzle core 312 of the injection molding nozzle 310 is. covered by a metal sleeve 320. The nozzle core 312 has a nozzle core resin path 321 arranged such that its horizontal cross section overlaps that of the valve pin 316.

[Embodiment 5]

Figure 8:
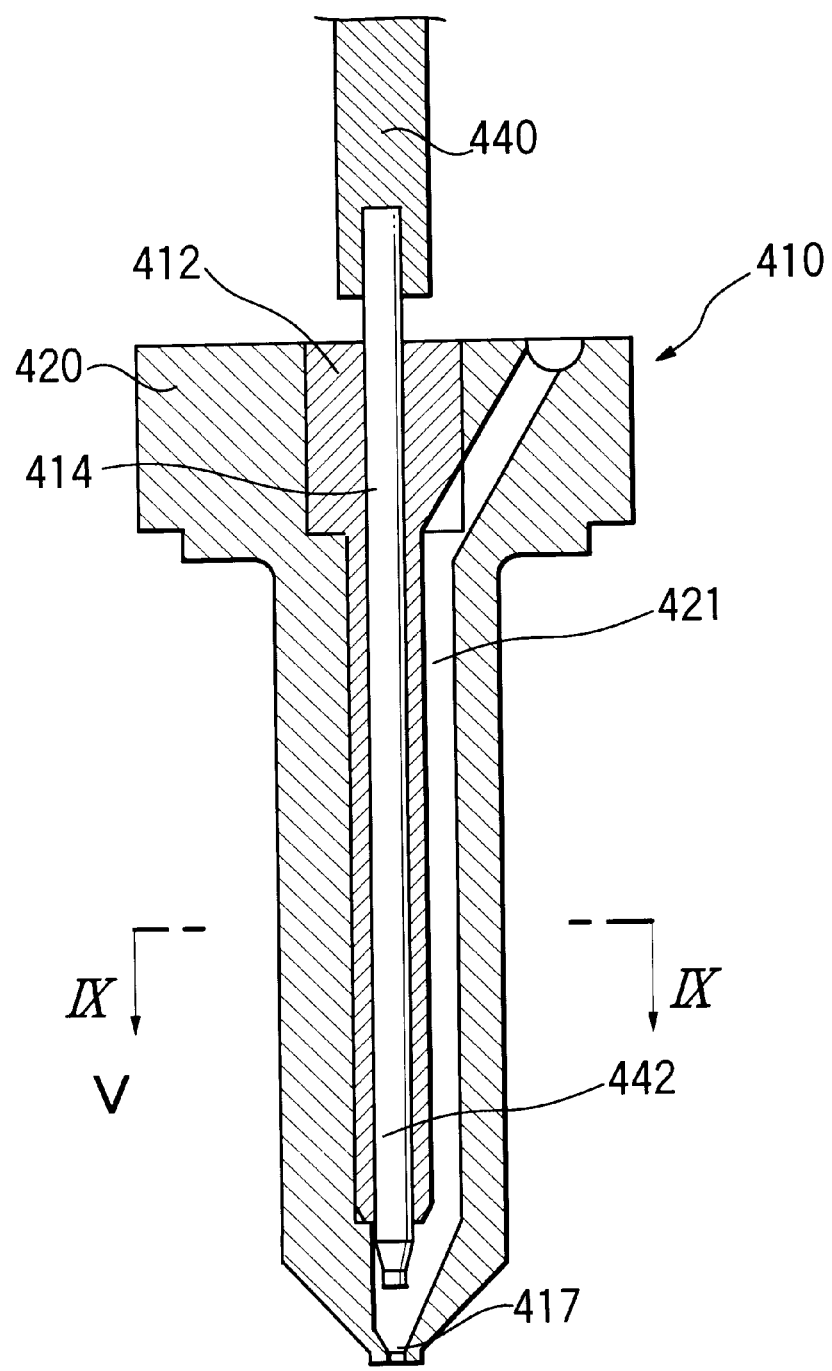
FIG. 8 is a schematic vertical cross sectional view of fifth embodiment of injection molding nozzle according to the present invention.
Figure 9:
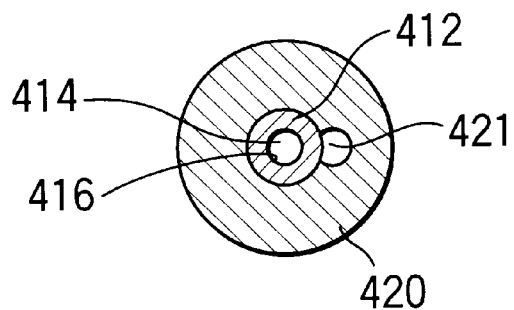
FIG. 9 is a schematic horizontal cross sectional view of the embodiment of FIG. 8 taken along line IX—IX.
Figure 10:
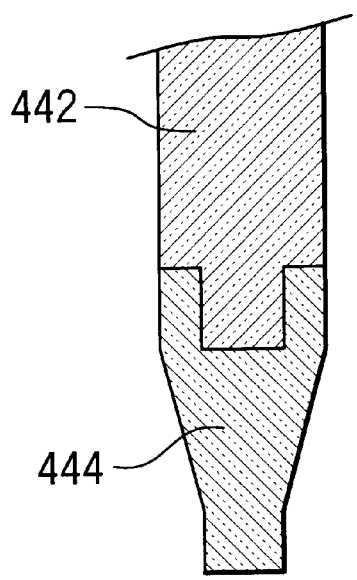
FIG. 10 is a schematic vertical cross sectional view of a lower portion of the valve pin of the fifth embodiment.

FIGS. 8, 9 and 10 schematically show a fifth embodiment of injection molding nozzle according to the invention. Referring to FIGS. 8, 9 and 10, the nozzle core 412 of the injection molding nozzle 410 of the second embodiment has a valve pin hole 416 that allows a valve pin 414 to pass therethrough. The nozzle core 412 of the injection molding nozzle 410 is rigidly shrinkage-fit into a metal sleeve 420. The metal sleeve 420 has a metal sleeve resin path 421 arranged such that its horizontal cross section overlaps that of the nozzle core 412. A gate 417 is formed at the lower end of the nozzle core 412. The valve pin 414 is formed by shrinkage-fitting an upper metal pin member 440 to be combined with an air cylinder unit (not shown), an intermediary ceramic pin member 442 arranged within the valve pin hole 416 and a lower ceramic pin member 444 to be combined with the gate 417.

[Embodiment 6]

Figure 11:
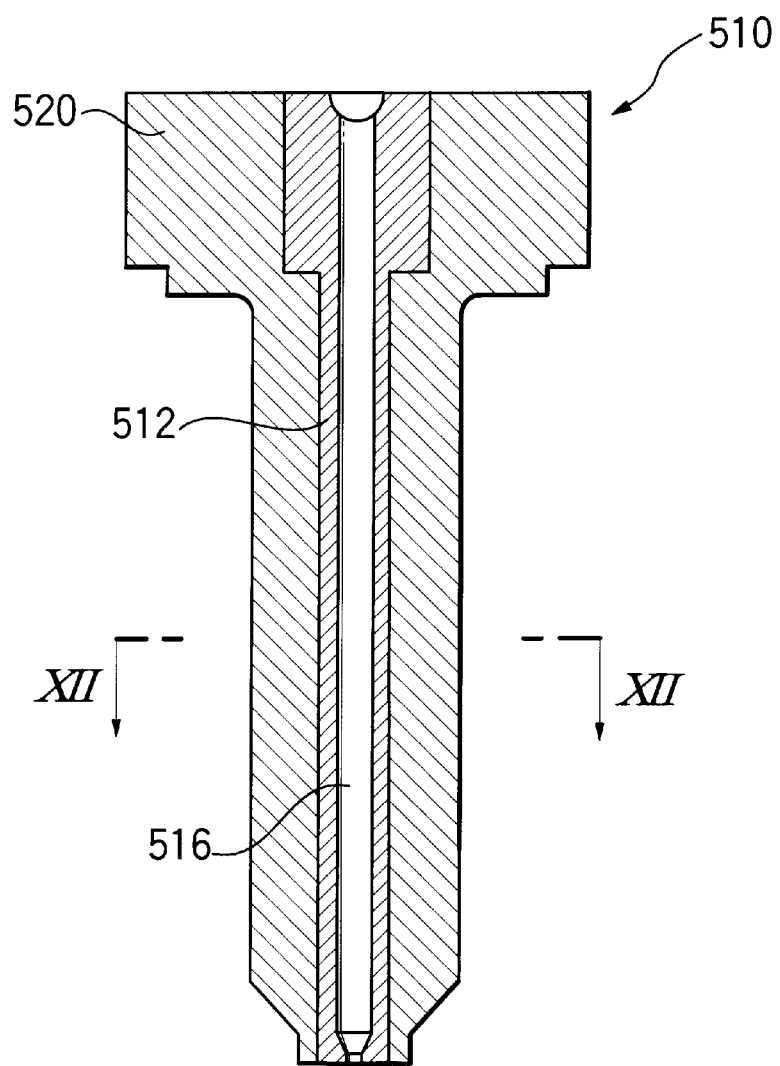
FIG. 11 is a schematic vertical cross sectional view of a sixth embodiment of injection molding nozzle according to the present invention.
Figure 12:
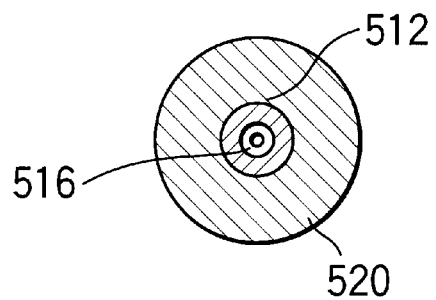
FIG. 12 is a schematic horizontal cross sectional view of the embodiment of FIG. 11 taken along line XII—XII.

FIGS. 11 and 12 schematically show a sixth embodiment of injection molding nozzle according to the invention. Referring to FIGS. 11 and 12, the nozzle core 512 of the injection molding nozzle 510 of the sixth embodiment has a resin path 516. The nozzle core 512 of the injection molding nozzle 510 is rigidly shrinkage-fit into a metal sleeve 520.

As described above, according to the invention, there is provided a injection molding nozzle that shows a high hardness and is chemically stable so that the inner surface thereof is not corroded nor the gas or the fluid forced to penetrate into the gap between the injection molding nozzle and the valve pin seize the valve pin regardless of the temperature and the pressure of the material to be injected.

With an injection molding nozzle according to the invention, its material shows a small coefficient of thermal expansion to make it easy to maintain a high degree of machining accuracy during the manufacturing process.

Additionally, with an injection molding nozzle according to the invention, the large coefficient of thermal expansion and the high machinability of the material of the nozzle enhance the surface smoothness and the surface planeness.

In an injection molding nozzle according to the invention, the valve pin is not pliable and does not give rise to a collapse on the part of the valve pin.

What is claimed is:

1. A nozzle for injection molding of resin or molten metal, said nozzle comprising:

a nozzle core made of a ceramic material, a metal sleeve for induction heating provided outside the nozzle core, an electromagnetic induction coil for heating the metal sleeve wound around the outer periphery of the metal sleeve, and an injection path formed in the nozzle core for receiving the resin.

2. A nozzle for injection molding of resin or molten metal, the nozzle comprising:

a nozzle core made of a ceramic material, a metal sleeve for induction heating provided outside the nozzle core, an electromagnetic induction coil for heating the metal sleeve wound around the outer periphery of the metal sleeve, a valve pin sliding hole formed in the nozzle core, and a valve pin for inserting into the valve pin sliding hole.

3. The nozzle for injection molding according to claim 2, wherein said valve pin is at least partly made of a ceramic material.

4. The nozzle for injection molding according to claim 2, wherein an injection path which communicates with a gate of the nozzle is formed between a nozzle core and a metal sleeve.

* * * * *